April 22, 1941. E. W. CARROLL ET AL 2,238,971
MECHANICAL FRUIT DICER
Filed Oct. 6, 1939  2 Sheets-Sheet 1
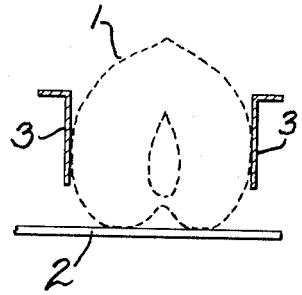
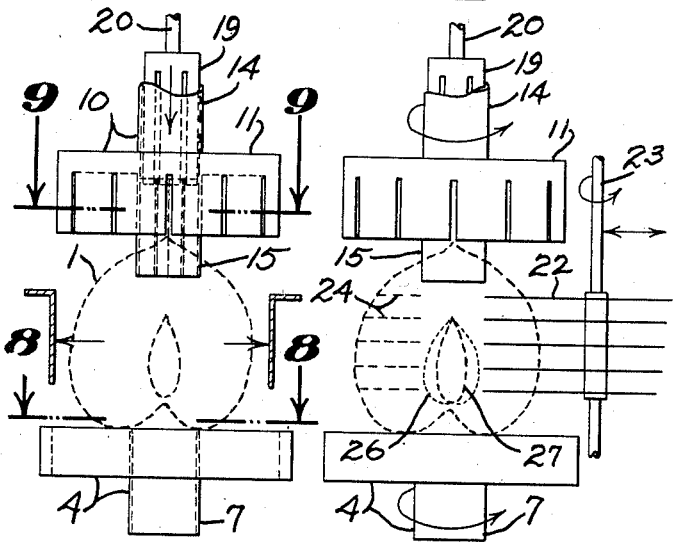
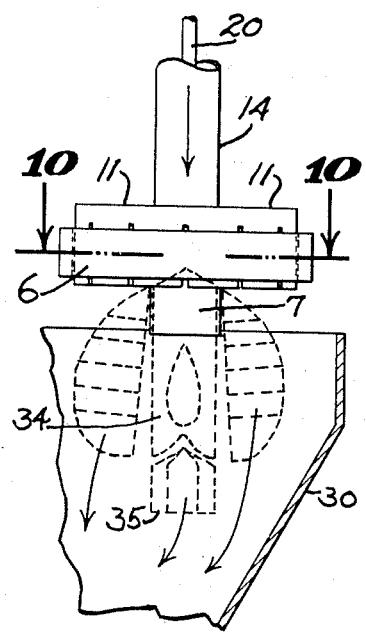
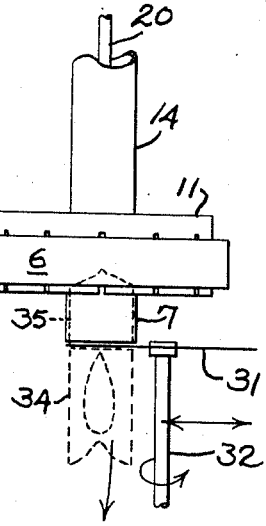
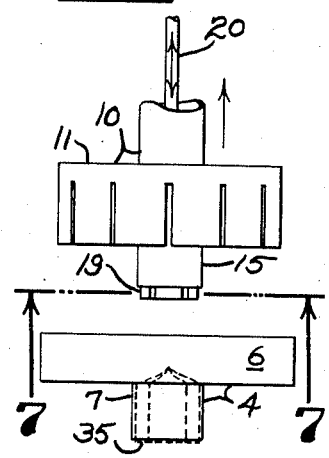
ELLSWORTH W. CARROLL.
CHARLES LACHMAN.
PAUL WORMSER.
INVENTORS.
BY Lippincott & Metcalf
ATTORNEYS.

April 22, 1941.  E. W. CARROLL ET AL  2,238,971
MECHANICAL FRUIT DICER
Filed Oct. 6, 1939   2 Sheets-Sheet 2

ELLSWORTH W. CARROLL.
CHARLES LACHMAN.
PAUL WORMSER.
INVENTORS.

BY *Lippincott & Metcalf*
ATTORNEYS.

Patented Apr. 22, 1941

2,238,971

UNITED STATES PATENT OFFICE 2,238,971

MECHANICAL FRUIT DICER

Ellsworth W. Carroll, Charles Lachman, and Paul Wormser, San Francisco, Calif., assignors to S & W Fine Foods, Inc., San Francisco, Calif., a corporation of California Application October 6, 1939, Serial No. 298,248

12 Claims. (Cl. 146—40)

Our invention relates to mechanical fruit dicers, and more particularly to a means and method of dicing fruit mechanically to produce a uniform product with a minimum of waste. Our invention is particularly applicable to the dicing of peaches, apples, pears, or other fruits having a pit or other unwanted core material.

Among the objects of our invention are: To provide a means and method for automatically, mechanically and continuously dicing fruit; to provide a mechanical dicer for peaches, apples, pears, and the like; to provide a means and method for mechanically dicing fruit with a minimum of waste; to provide a means and method for dicing and coring a fruit simultaneously; to provide a means and method of mechanically coring fruit simultaneously with a dicing operation; to provide a means and method of eliminating hand dicing of fruit; and to provide a simple, mechanical device for dicing whole fruit which may be either continuously and automatically operated or hand operated to produce a uniform product at a low cost.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus of the present application, as we may adopt various other apparatus embodiments, utilizing the method, within the scope of the appended claims.

In the drawings we have chosen a peach to illustrate our method and the operation of our machine.

Fig. 1 is a diagrammatic view showing a peach held in an orientated position, with the stem indent down.

Fig. 2 is a diagrammatic view partly in elevation, showing the peach resting on the coring knife and with the blossom end of the fruit cut.

Fig. 3 is a diagram showing the next step in the cutting of the peach, namely, the making of the annular cuts around the core material.

Fig. 4 is a diagrammatic view showing the peach being forced through the coring and dicing knife.

Fig. 5 is a diagram showing the cutting of the unwanted core material from the blossom end pieces.

Fig. 6 is a diagram showing the next step in the movement of the parts in the machine.

In the above drawings, movement of the parts and direction of movement is indicated by arrows throughout, and the peach and its eventual cut pieces are indicated by dash lines. It will be obvious to those skilled in the art that the motion of the various parts may be accomplished either by hand or by any convenient synchronized rotating machinery. Such machinery has been omitted for the sake of clarity, it being recognized that no movements are necessary requiring part inter-linkages that are beyond the skill of the ordinary mechanic.

Broadly as to method, our invention comprises making a circular cut in the blossom end of a peach or similar fruit, to engage a cylinder having an axis substantially coextensive with the major axis of the core, this cut being continued only part way to the unwanted core material. The fruit may then be rotated to make annular cuts around the core material at right angles to the core, the engagement of the blossom end of the fruit serving as a means whereby the fruit may be rotated. The fruit is then cored by making a further cylindrical cut substantially coextensive with the original blossom end cut to separate the lateral meat from the core and blossom end material. The core is then removed from the blossom end material and the blossom end material is mixed with the lateral meat previously removed. Our method, therefore, saves a large percentage of meat which would normally be included in a coring cut taken through the entire length of the fruit, and consequently a high percentage of meat is saved for use.

Broadly as to apparatus, our invention comprises a combined coring and dicing knife upon which a peach or similar fruit is supported, with a circular coring blade positioned around the stem indent of the fruit. The blossom end of the fruit is then engaged by a cylindrical knife which is forced into the fruit, and the fruit is then rotated around the major axis of the core. Lateral knives are forced into the fruit to make lateral cuts therein into core material. A mandrel having slots therein fitting the radial blades of the combined coring and dicing knife is then forced against the fruit to push the entire fruit through the coring and dicing knife, thus separating the lateral cut meat from unwanted core material and dicing it at the same time. The blossom end cuts are extended simultaneously down to unwanted core material, and means are provided to transfer the hold on the cylindrical cut through the center of the fruit to the circular blade in the coring and dicing knife. The core material below the engaged blossom end meat is then cut off, leaving the blossom end meat in the circular blade of the coring and dicing knife. The ejection of the next core causes the ejection of the blossom end meat ahead of it at the time of the separation of the lateral meat so that blossom end meat joins the lateral meat in the output.

Our invention may be more fully understood by a detailed description of the drawings.

Figure 7:
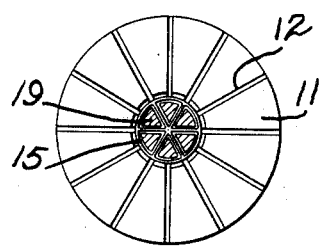
Fig. 7 is a view partly in plan and partly in section of the rotatable piston assembly, taken as indicated by the line 7—7 in Fig. 6.
Figure 8:
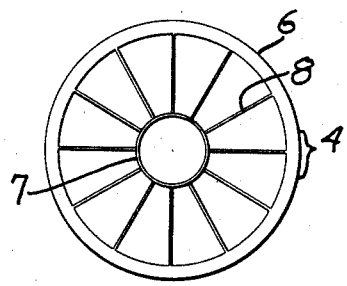
Fig. 8 is a plan view of the coring and dicing knife, taken as indicated by the line 8—8 in Fig. 2.
Figure 9:
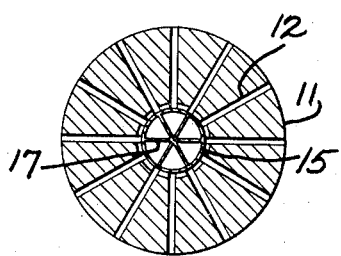
Fig. 9 is a sectional view of the rotatable piston assembly, taken as indicated by the line 9—9 in Fig. 2.
Figure 10:
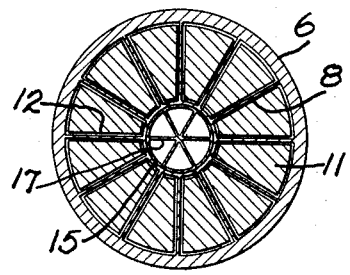
Fig. 10 is a sectional view showing the engagement of the coring and dicing knife in the rotatable piston assembly, taken as indicated by the line 10—10 in Fig. 4.
Figure 11:
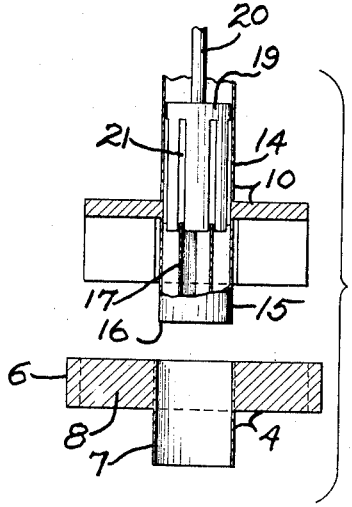
Fig. 11 is a fragmentary view partly in section and partly in elevation, showing the relationship of the end piece piston to the rotable piston assembly.
Figure 12:
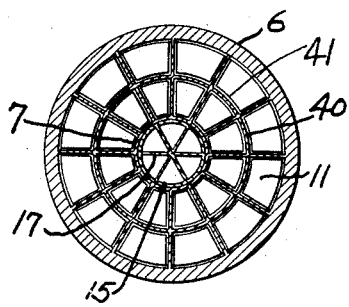
Fig. 12 is a sectional view, showing a coring knife and mandrel using an intermediate circular blade.

In Fig. 1, a peach 1, orientated either by hand or by an automatic machine, such as has been described and claimed in a prior application of Ellsworth W. Carroll for United States Letters Patent entitled "Full automatic orientator," Serial No. 211,140, filed June 1, 1938, is deposited on a support member 2 and gripped by arms 3. The peach may then be transported in orientated position and deposited on a combined coring and dicing knife 4 with the stem indent centralized thereon. This combined coring and dicing knife, shown in plan view in Fig. 8, comprises a rim 6 and a central cylindrical coring blade 7, the coring blade 7 being joined to rim 6 by a plurality of radial blades 8. Obviously, however, blades 8 may be along any outwardly extending lines and do not have to be radial, according to the eventual shape of the lateral fruit pieces desired.

Cylindrical coring knife 7 extends well below the level of the radial blades 8 and rim 6 to provide an axis of rotation for coring and dicing knife 4 and to hold blossom end fruit pieces, as will be described later. Immediately over coring and dicing knife 4 and coaxial therewith is a rotatable piston assembly 10 comprising a radial blade mandrel 11 having radial slots 12 therein into which radial blades 8 of the combined coring and dicing knife may enter. Radial blade mandrel 11 is concentrically fastened to a central cylinder 14 passing through mandrel 11 and terminating toward coring and dicing knife 4 in a blossom end dicing blade 15, this blade having a circular edge 16 and internal radial fins 17. Blossom end dicing blade 15 is made very slightly smaller in external diameter than the internal diameter of the circular coring blade 7 of the coring and dicing knife 4, so that when the piston assembly and coring and dicing knife are brought together blossom end knife 15 will fit snugly inside of the top of coring blade 7. Axial cylinder 14 is hollow throughout its full extent and contains therein a piston 19 operated by piston rod 20. Piston 19 is provided with piston slots 21 fitting radial fins 17 so that piston 19 can be reciprocated to force out any fruit meat engaged within blossom end blade 15.

Referring next to Fig. 3, it will be seen that the fruit 1 is solidly engaged at one end by blossom end knife 15 and at the other end by having its stem end in contact with the circular and radial blades of coring and dicing knife 4. The entire piston assembly and the coring and dicing knife 4 may then be rotated as a whole on the common axis, thus rotating the fruit. While the fruit is rotating circular lateral knives 22, mounted on vertical shaft 23 at one side of the center section of the fruit, are forced into the fruit toward the core, and these knives may also be rotated to make a plurality of parallel, annular cuts 24 around the core material and into it, if desirable, as preparation for the following coring cut. In the case of the peach it will be found that the pit, which comprises most of the unwanted core material, has a large diameter as indicated by small dash line 26 in Fig. 3, and a small diameter as indicated by the heavier dash line 27 in the same figure. Consequently as the peach rotates the diameter of the uncut core material must necessarily be regulated by the larger diameter of the pit.

After the annular cuts have been made circular knives 22 are removed laterally and the piston assembly is forced toward the combined coring and dicing knife. This movement first causes the blossom end knife 15 to enter deeper into the peach material than at its previous engagement, and as the meat of the peach outside of the blossom end blade 15 contacts mandrel 11 the entire fruit will be forced through the coring and dicing knife. The core is separated from the lateral meat by the cutting action of the coring blade 7, and a plurality of vertical cuts in the already annularly cut meat is made by the radial blades 8. The relative movement of the upper and lower parts is continued until the radial blades of the coring and dicing knife are fully entered into the radial blade mandrel 11 and the blossom end knife 15 has entered into the inside of coring blade 7. At this time the lateral meat is completely severed from the core material as shown in Fig. 4, and the diced and severed core material falls into output chute 30, to be utilized as food. The core, however, is still attached to the blossom end meat first engaged and now held by blossom end knife 15, and therefore does not fall into chute 30 but hangs directly below the lower end of coring blade 7. Output chute 30 may then be swung to one side, and a cut-off knife 31 mounted on cut-off knife shaft 32 may then be brought in laterally to cut away the unwanted core material, indicated by dash line 34, from the blossom end material 35 remaining in the blossom end blade 15, as shown in Fig. 5.

Mandrel 11 is then withdrawn from its engagement with coring and dicing knife 4, and at the same time piston 19 is forced downwardly between fins 17 of blossom end blade 15 to force blossom end pieces, as indicated by broken line 35 in Figs. 5 and 6, out of blossom end blade 15 and into the lower portion of coring knife 17 where these pieces remain due to their natural expansion, all as shown in Fig. 6. The withdrawal of piston assembly 10 from coring and dicing knife 4 is then completed and the two main parts are ready for the reception of another peach therebetween for a repetition of the cycle.

The second cycle, however, will be somewhat different from the first cycle because as the lateral meat is severed from the core material as shown in Fig. 4, and the core is forced through the coring blade 7, the blossom end pieces 35 remaining in the bottom of coring blade 7 will be forced out of the end of coring blade 7 and will fall into output chute 30 along with the cut, diced pieces from the sides of the peach. Thus, we obtain a simultaneous and complete deposit of all of the good meat in output chute 30 and yet hold onto the unwanted core material for later removal and separate disposal. Such a complete segregation is accomplished by leaving the blossom end pieces of a previously processed peach in the central coring knife for removal by the piston action of the core in the next peach to be processed.

Several modifications of our invention will immediately suggest themselves to those skilled in the art, namely, the first stage may be dispensed with and the peach may be placed by hand directly between the piston assembly 10 and the coring and dicing knife 4. In addition, it will be obvious that the shapes and sizes of the various knives may be changed without altering the fundamental nature of our invention in any manner. If the fruit is of large diameter it may be desirable to utilize an additional circular blade 40 entering a circular slot 41 in mandrel 11. This additional blade cuts the lateral segments into two parts. Furthermore, it will be apparent to those skilled in the art that the amount of blossom end material removed by the blossom end blade may be varied to suit various fruits which have more or less good meat at this point.

It should be pointed out in this regard that many fruits, such as some varieties of peach, for example, have the pit or other unwanted core material relatively near to the stem indent with a relatively large amount of good meat at the blossom end of the fruit but in line with any complete coring cut that could economically be made. This meat we have saved and made usable in our method of mechanically cutting the peach, and as a consequence very little usable meat is wasted in the core 34, which in the case of the peach will of course contain the pit.

Thus, we are able to attain a high percentage of good meat recovery by the utilization of the mechanical means and method described just above and claimed hereafter. Heretofore mechanical dicing methods wasted too large a percentage of fruit to make the prior methods efficient and useful for commercial purposes. The method and apparatus herein described has so little waste that practical and commercial mechanical dicing of fruit can be practiced therewith. We have thus removed the greatest objection to the mechanical cutting of the fruit for dicing purposes.

We claim:

1. Method of cutting fruit having a core which comprises engaging and cylindrically cutting the blossom end of said fruit in line with the core into core material, cutting the core away from the remainder of the fruit leaving the core and engaged portion as a unit, cutting the core from the engaged portion, and saving and dicing the engaged portion.

2. Method of cutting fruit having a core which comprises engaging and cutting the blossom end of said fruit in line with the core into core material, rotating said fruit, making a plurality of lateral parallel and annular cuts around core material below the engaged portion, separating the laterally cut portions from the core and engaged portion, and cutting the core from the engaged portion.

3. The method of coring fruit which comprises forcing said fruit against a coring knife to separate side meat from a cylinder including the core, holding the one end of said cylinder in said knife, cutting off end meat held in said knife from unwanted core material, end utilizing the core cylinder of the next fruit forced against said knife to force said end meat out of said knife.

4. Method of cutting fruit having a core which comprises engaging and cutting the blossom end of said fruit in line with the core into core material, rotating said fruit, making a plurality of lateral parallel and annular cuts around core material below the engaged portion, making a cylindrical cut encompassing said core to separate the laterally cut portions from the core and engaged portion, and cutting the core from the engaged portion.

5. Method of cutting fruit having a core which comprises engaging and cutting the blossom end of said fruit in line with the core into core material, rotating said fruit, making a plurality of lateral parallel and annular cuts around core material below the engaged portion, making a cylindrical cut encompassing said core to separate the laterally cut portions from the core and simultaneously making a plurality of radial cuts in the laterally cut portions, and cutting the core from the engaged portion.

6. Method in accordance with claim 2 including the additional step of cutting the engaged portion of the blossom end of the fruit both cylindrically and radially.

7. Method in accordance with claim 2 including the additional step of radially cutting the laterally cut portions during separation from the core and the engaged portion.

8. Method in accordance with claim 2 including the additional step of cutting the laterally cut portions both cylindrically and radially during separation from the core and engaged portion.

9. Method in accordance with claim 2 including the additional steps of cutting the engaged portion of the blossom end both cylindrically and radially and cutting the laterally cut portions both cylindrically and radially during separation from the core and engaged portion.

10. A fruit dicer comprising a female member having a female hollow cylinder terminating in a sharpened edge and fins radiating from said cylinder and each having a sharpened edge in the plane of the sharpened edge of said cylinder, and a male member having a male hollow cylinder terminating in a sharpened edge, said male cylinder being slightly smaller than said female cylinder, to enter therein, a plurality of solid portions attached to said male cylinder and fitting between said radiating fins said members being capable of relative movement to intermesh said cylinders with said solid portions entering between said fins, and a piston slidable in said male cylinder.

11. A fruit dicer comprising a female member having a female hollow cylinder terminating in a sharpened edge and fins radiating from said cylinder and each having a sharpened edge in the plane of the sharpened edge of said cylinder, and a male member having a male hollow cylinder terminating in a sharpened edge, said male cylinder being slightly smaller than said female cylinder, to enter therein, a plurality of solid portions attached to said male cylinder and fitting between said radiating fins said members being capable of relative movement to intermesh said cylinders with said solid portions entering between said fins, and radial internal fins in said male cylinder.

12. A fruit dicer comprising a female member having a female hollow cylinder terminating in a sharpened edge and fins radiating from said cylinder and each having a sharpened edge in the plane of the sharpened edge of said cylinder, and a male member having a male hollow cylinder terminating in a sharpened edge, said male cylinder being slightly smaller than said female cylinder, to enter therein, a plurality of solid portions attached to said male cylinder and fitting between said radiating fins said members being capable of relative movement to intermesh said cylinders with said solid portions entering between said fins, radial internal fins in said male cylinder, and a piston slidable within said male cylinder, said piston having slots to accommodate said radial internal fins.

ELLSWORTH W. CARROLL.
CHARLES LACHMAN.
PAUL WORMSER.